Figure 1:
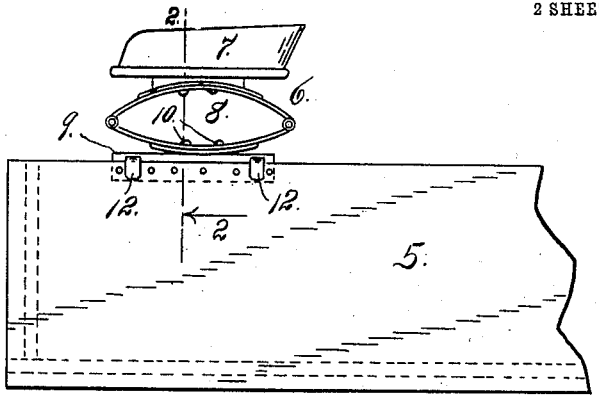

F. STEWART.
FASTENING MEANS FOR VEHICLE SEATS.
APPLICATION FILED MAR. 3, 1911.

1,056,956.

Patented Mar. 25, 1913.

2 SHEETS—SHEET 1.

Witnesses
Otto E. Hoddick
H. Ebert O'Brien

Inventor
Frank Stewart
By C. H. O'Brien
Attorney

F. STEWART.
FASTENING MEANS FOR VEHICLE SEATS.
APPLICATION FILED MAR. 3, 1911.
1,056,956.
Patented Mar. 25, 1913.
2 SHEETS—SHEET 2.
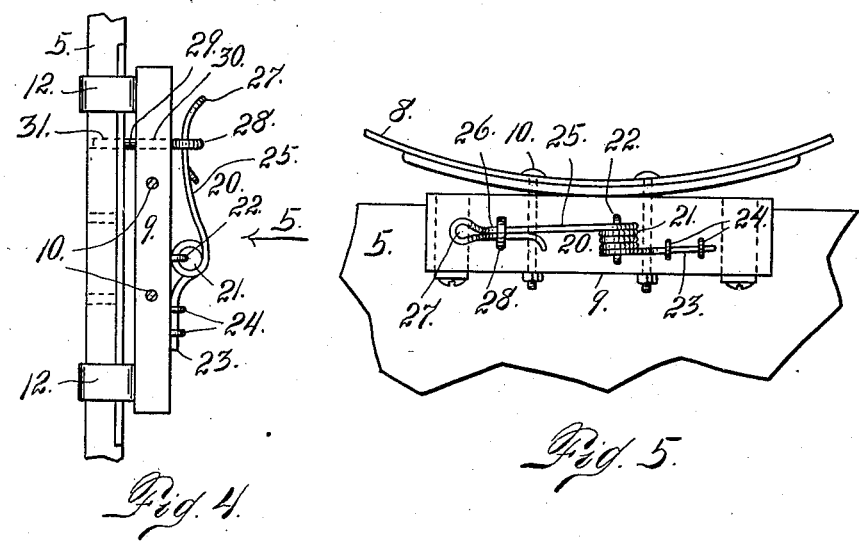
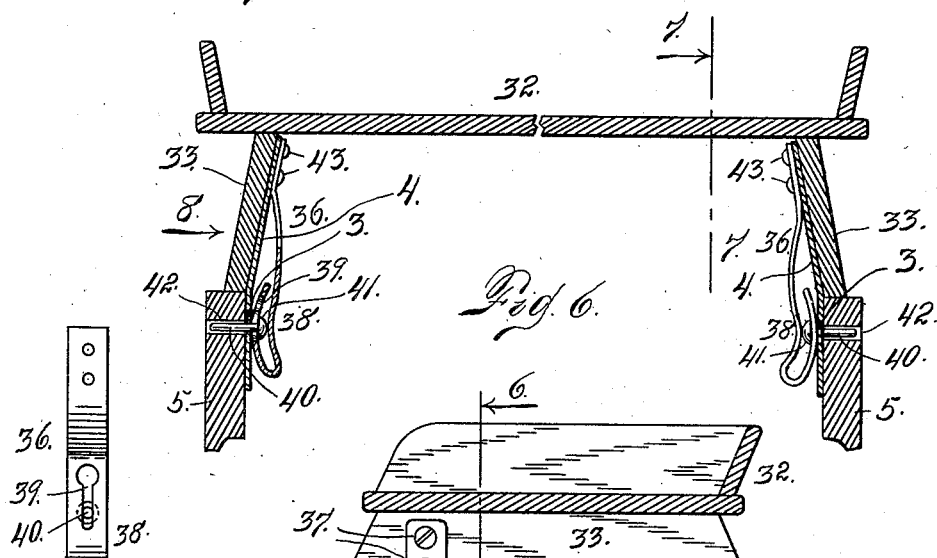

UNITED STATES PATENT OFFICE.

FRANK STEWART, OF ASPEN, COLORADO, ASSIGNOR OF ONE-FOURTH TO D. E. DE MARAIS, OF ASPEN, COLORADO.

FASTENING MEANS FOR VEHICLE-SEATS.

1,056,956.  Specification of Letters Patent. Patented Mar. 25, 1913.

Application filed March 3, 1911. Serial No. 611,974.

*To all whom it may concern:*

Be it known that I, FRANK STEWART, a citizen of the United States, residing at Aspen, county of Pitkin, and State of Colorado, have invented certain new and useful Improvements in Fastening Means for Vehicle-Seats; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for fastening the seats of vehicles to the box or body upon which the seat is mounted, in such a manner that the seat cannot accidentally become disengaged by vertical movement or change its position by sliding, as very often happens where these seats are only connected with the sides of the wagon body by means of the usual hooks connected with the seat bars and engaging the upper edges of the sides of the wagon body.

My improved construction consists in applying springs to the inner surfaces of the bars or other support of the seat with which the supporting hooks are connected. To these springs are respectively attached pins adapted to pass through openings in the bars and to enter registering openings formed in the adjacent sides of the vehicle body. In the case of solid seats where bars are not employed, the springs carrying the pins are attached to the depending end portions of the seat and the pins may pass through metal straps with which the depending parts of the seat are equipped, and thence through the sides of the wagon body. These pins by virtue of the tension of the springs, maintain their position within the openings in the metal straps and the sides of the wagon body, until disengaged therefrom by design. As there is one of these springs attached to each bottom bar of the seat in the case of spring seats, and to each depending side member in the case of solid seats, and as the pins of the springs enter openings in the opposite sides of the vehicle body, it will be understood that the seat is securely fastened in place against either vertical or sliding movement.

Having briefly outlined my improved construction, I will proceed to describe the same in detail, reference being made to the accompanying drawing in which is illustrated an embodiment thereof.

Figure 2:
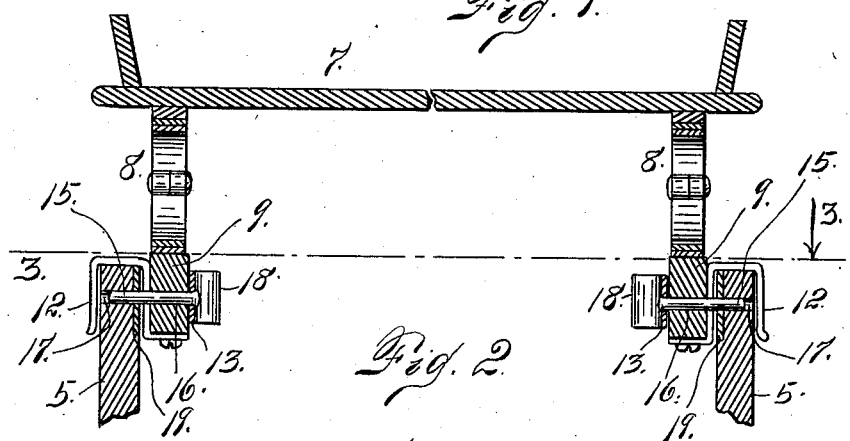
Figure 3:
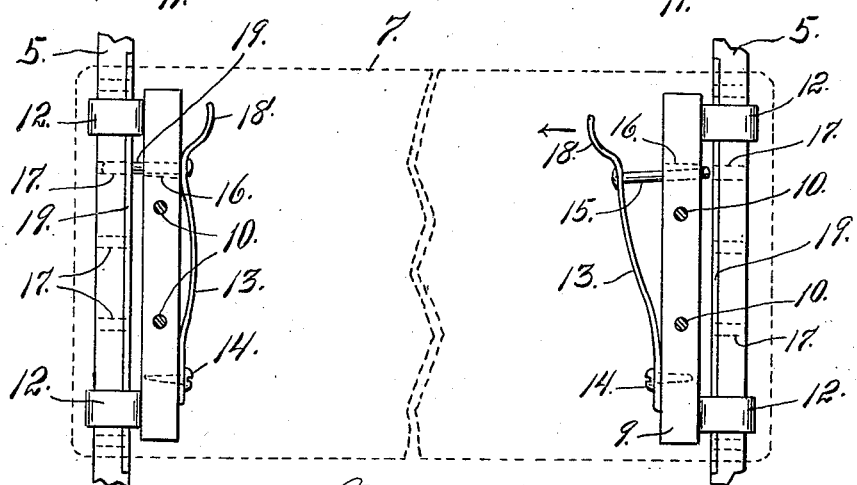

In this drawing: Figure 1 is a fragmentary side elevation of a wagon body or box showing a spring seat equipped with one form of my improvement. Fig. 2 is a section taken on the line 2—2, Fig. 1, the parts being shown on a larger scale. Fig. 3 is a section taken on the line 3—3, Fig. 2, looking downwardly or in the direction of arrow 3. Fig. 4 is a top plan view in detail illustrating another form of construction. Fig. 5 is a view of the same looking from the inside of the wagon body or box, or in the direction of arrow 5, Fig. 4. Fig. 6 is a vertical section taken through a seat and the upper portion of the sides of a vehicle body or box showing the device applied to a seat devoid of springs. Fig. 7 is a section taken on the line 7—7, Fig. 6, viewed in the direction of the arrow. Fig. 8 is a detail view of one of the springs looking in the direction of arrow 8, Fig. 6.

The same reference characters indicate the same parts in all the views.

Referring first to Figs. 1 to 3 inclusive, let the numeral 5 designate each of the sides of a wagon body upon which is mounted a spring seat 6 composed of a seat member 7, elliptical springs 8 and bottom bars 9 to which the springs are secured by suitable fastening devices 10. These bars 9 are provided with the usual hooks 12 adapted to engage the upper edges of the sides 5 of the wagon body for supporting the seat in place. My improvement as illustrated in these views, consists in equipping each of the bars 9 with a spring 13 which is secured to the bar at one extremity by a screw or other fastening device 14, while near its opposite extremity it is equipped with a pin 15 adapted to pass through an opening 16 formed in the bar 9 and also entering a registering opening 17 formed in the adjacent side 5 of the vehicle body. The wagon body is provided with a series of openings 17 whereby the position of the seat may be regulated at will, to vary its distance from the forward extremity of the body. The springs 13 are strong enough or of sufficient tension to maintain the pins in interlocking relation with the seat bars and the sides of the wagon body. In order that the pins 15 may be readily withdrawn from the openings 17 in the sides of the wagon body, each spring is provided with an outwardly curved portion 18 extending beyond its pin 15 and forming a finger-hold for the purpose. When these springs are moved inwardly to the position indicated by the right-hand spring in Fig. 3, the seat may be disengaged from the body of the vehicle in the usual manner. Attention is called to the fact that it is preferred to apply metal plates 19 to the inner surface of the sides 5 of the wagon body, these plates being set into the sides of the body so that their exposed surfaces shall be flush therewith. The openings which receive the pins 15, pass through these plates and the latter prevent the wood from becoming worn, due to the insertion and removal of the securing pins.

In the form of construction shown in Figs. 4 and 5, a spring 20 is employed having a coil member 21 connected with the vehicle body by a staple 22. One extremity 23 of this spring is secured to the body by staples 24 or other suitable fastening devices. From the coil 21 and extending in the opposite direction from the part 23, a part 25 of the spring is doubled as shown at 26, to form a loop 27, this looped portion being passed through the eye 28 of a pin 29 adapted to enter openings 30 and 31 formed in the seat bar 9 and the side 5 of the vehicle body, respectively. Attention is called to the fact that the looped extremity of the spring is slidable in the eye 28 of the fastening pin so that the two openings 30 and 31 may be in exact register and fit the bolt closely.

In the construction shown in Figs. 6, 7 and 8, the seat 32 is devoid of the usual supporting springs, having depending members 33 provided with metal straps 34 which enter loops 35 applied to the vehicle body on the inside. These loops 35 prevent the seat from shifting lengthwise of the body. Each depending side part 33 of the seat is also provided with a vertically disposed spring 36 secured at its upper extremity to the seat as shown at 37, while its opposite extremity is bent to form a loop 38, the inner member of which has an elongated opening 39 through which a pin 40 is passed, the head 41, however, being too large to pass through the opening 39. This pin 40 is adapted to enter an opening 3 formed in a metal strap 4 and a registering opening 42 formed in the side of the vehicle body, whereby the seat is prevented from vertical movement. As illustrated in the drawing the metal straps 4 extend the entire depth of the depending end parts 33 of the seat, and the springs 36 are secured thereto and to the parts 33 by suitable fastening devices 43. As the springs 36 are of the same width as the straps 3, the straps do not show in Fig. 7 except their lower extremities.

The value of my improved device will be readily understood by all persons who are familiar with the use of what are known as spring or other detachable seats on vehicle bodies. It very often happens that when only the usual hooks are employed for retaining the seat in place, these hooks become disengaged while passing over rough roads, and particularly when traveling at considerable speed; and there is even greater danger when a team becomes partially unmanageable or is attempting to run away, since in this event it is of the utmost importance that the seat should be firmly held in place since if it slides in either one direction or the other, the driver who is attempting to hold the horses is at a great disadvantage. On the contrary, with my improved construction, all difficulties of this kind are overcome and the seat is perfectly secure at all times against becoming detached except by design.

Having thus described my invention, what I claim is:

The combination with the body of a vehicle and a seat therefor, of springs attached to the seat and carrying pins near the free extremities of the springs, the pins being loosely connected with the springs to allow the necessary movement to prevent binding, and the extremities of the springs where the pins are located being formed into loops, the heads of the pins occupying positions between the two parts of the loops to prevent the pins from escaping from the springs, substantially as described.

In testimony whereof I affix my signature in presence of two witnesses.

FRANK STEWART.

Witnesses:
 F. E. BOWEN,
 HORTENSE UHLRICH.

---

Copies of this patent may be obtained for five cents each, by addressing the "Commissioner of Patents, Washington, D. C."